United States Patent
Heeke

(10) Patent No.: US 11,926,012 B2
(45) Date of Patent: Mar. 12, 2024

(54) DEVICE FOR MACHINING ROD-SHAPED WORKPIECES SUCH AS WINDOW PROFILES OR DOOR PROFILES

(71) Applicant: SCHIRMER MASCHINEN GMBH, Verl (DE)

(72) Inventor: Andreas Heeke, Verl (DE)

(73) Assignee: SCHIRMER MASCHINEN GMBH, Verl (DE)

( * ) Notice: Subject to any disclaimer, the term of this patent is extended or adjusted under 35 U.S.C. 154(b) by 1246 days.

(21) Appl. No.: 16/470,769

(22) PCT Filed: Dec. 20, 2016

(86) PCT No.: PCT/EP2016/081876
§ 371 (c)(1),
(2) Date: Apr. 15, 2020

(87) PCT Pub. No.: WO2018/113915
PCT Pub. Date: Jun. 28, 2018

(65) Prior Publication Data
US 2020/0269377 A1 Aug. 27, 2020

(51) Int. Cl.
*B23Q 39/02* (2006.01)
*B23C 1/12* (2006.01)
(Continued)

(52) U.S. Cl.
CPC ............ *B23Q 39/027* (2013.01); *B23P 23/02* (2013.01); *B27M 1/08* (2013.01); *B23C 1/12* (2013.01);
(Continued)

(58) Field of Classification Search
CPC .... B23Q 39/025–027; B23Q 2210/006; Y10T 409/307672; Y10T 409/308232; Y10T 409/308512
(Continued)

(56) References Cited

U.S. PATENT DOCUMENTS 4,589,174 A 5/1986 Allen
2019/0168350 A1* 6/2019 Vogt ........................ B27C 9/04

FOREIGN PATENT DOCUMENTS

CN 101362302 A 2/2009
CN 104015230 A 9/2014
(Continued)

OTHER PUBLICATIONS

International Search Report (dated Jul. 26, 2017) for corresponding International App. PCT/EP2016/081876.
(Continued)

*Primary Examiner* — Erica E Cadugan
(74) *Attorney, Agent, or Firm* — WRB-IP PLLC

(57) ABSTRACT

A device is provided for machining rod-shaped workpieces such as window profiles or door profiles. The workpieces can be moved in a horizontal plane in a Z direction by a transport device. A machining device with tools is provided in a plane arranged substantially vertically to the direction of movement of the workpieces, which machining device is spatially oriented in the vertical plane in relation to the workpiece. The machining device includes an open arc arranged in the vertical plane to the workpiece, the arc being mounted to rotate about the workpiece in the Z axis as an open flat ring.

12 Claims, 6 Drawing Sheets

(51) Int. Cl.
*B23P 23/02* (2006.01)
*B27M 1/08* (2006.01)
*B23C 3/00* (2006.01)
*B23C 3/12* (2006.01)
*B27C 9/04* (2006.01)

(52) U.S. Cl.
CPC .............. *B23C 3/002* (2013.01); *B23C 3/128* (2013.01); *B23Q 2210/006* (2013.01); *B23Q 2240/007* (2013.01); *Y10T 29/5107* (2015.01); *Y10T 409/305208* (2015.01); *Y10T 409/308232* (2015.01); *Y10T 409/308344* (2015.01)

(58) Field of Classification Search
USPC .......................................... 409/201, 211, 216
See application file for complete search history.

(56) References Cited

FOREIGN PATENT DOCUMENTS

| | | |
|---|---|---|
| CN | 105764656 A | 7/2016 |
| DE | 19725043 A1 | 12/1998 |
| EP | 1944143 A2 | 7/2008 |
| EP | 2862671 A1 | 4/2015 |
| JP | H0435804 A | 2/1992 |
| JP | H0724677 A | 1/1995 |
| WO | 0236302 A1 | 5/2002 |

OTHER PUBLICATIONS

Japanese Official Action (dated Dec. 2, 2020) for corresponding Japanese App. 2019-553622.
Chinese Official Action (dated Dec. 2, 2020) for corresponding Chinese App. 201680092081.X.

* cited by examiner

DEVICE FOR MACHINING ROD-SHAPED WORKPIECES SUCH AS WINDOW PROFILES OR DOOR PROFILES

BACKGROUND AND SUMMARY

The invention relates to a device for machining rod-shaped workpieces such as window profiles or door profiles, which can be moved in a horizontal plane in a Z direction by a transport device, and wherein a machining device with tools is provided in a plane arranged substantially vertically to the direction of movement of the workpieces (2) in the Y direction, which machining device is spatially oriented in the vertical plane in relation to the workpiece.

PRIOR ART

When machining profiles which are used to produce doors or windows, numerous different work processes must be implemented. Such profiles may consist of or comprise plastic, metal, or wood. A combination of different materials is also possible. For example, if plastic hollow profiles are being machined for windows, drainage slots must be milled diagonally into the rabbet and/or downward and/or toward the front. In addition, locking part positioning holes must be placed on a frame profile and/or on a transom profile.

Furthermore, lock cases may have to be milled. Central screws for roller blind guide bars and rain guards must likewise be installed. Furthermore, corner hinge holes must be provided in the sash hinge fitting. The diameter for drainage and ventilation slots are larger here, while the locking part holes as well as the corner hinge holes usually have a smaller diameter. In order to implement these different holes and milling grooves, various machining tools, such as drills or milling tools in different sizes, are required.

With automated machining, there is no option, for example, to replace the drill bit with a single drill because the effort for this would be too much. It is easier to provide drills with respectively different bits or different drills and milling tools right from the start. In order to satisfy this machining complexity and to provide the most automated machining possible, DE 197 25 043 A1 discloses a device for machining structural elements. The known device in this case has a machining device, extended over a plane arranged substantially vertically with respect to the direction of movement of the structural elements, with its machining tools, which are aligned spatially as relates to the workpiece. The machining tools in this case are located on a support element such that the machining tools provided on the support element reach the workpieces being machined, provided in the transport direction correspondingly by moving the yoke-like support element.

Full-circumference rings are also known as machining elements, on which the tools are then arranged on the circular circumference accordingly. By moving the workpiece to be machined through the ring, the tools are correspondingly rotated on the ring such that the corresponding tool takes on the machining, on the profile in this case.

With this known embodiment, it is considered to be disadvantageous that the machining tools provided on the support element, as relates to flexible machining, could still be improved greatly with respect to the machining speed on the workpiece. In addition, it is considered to be disadvantageous that a corresponding device length must be reserved particularly by the individual machining stations, whether it be cross-cut sawing or drilling/milling or the like, in order to provide the corresponding machining units on the device in this manner. This particularly has the disadvantage that the machining line must be designed long enough in order to engage the corresponding machining tools successively.

Representation of the Invention

Thus, it is desirable to further improve a device for machining rod-shaped workpieces, which ensures, on one hand, increased process reliability while providing a gentle surface finishing with respect to machining the workpiece, wherein particularly the machining time of the workpiece should also be substantially shortened. In addition, the machining tool's machining approach to the workpiece on the transport device should be maintained substantially more flexibly, wherein it should also be considered that the device for machining rod-shaped workpieces should become substantially shorter in design.

According to an aspect of the invention, a device is provided for machining rod-shaped workpieces such as, for example, window profiles or door profiles, which can be moved in a horizontal plane in a Z direction by a transport device, and wherein a machining device with tools is provided in a plane arranged substantially vertically to the direction of movement of the workpieces, which machining device is spatially oriented in the vertical plane in relation to the workpiece, wherein the machining device comprises an open arc arranged in the vertical plane to the workpiece, the arc being mounted to rotate about the workpiece as an open flat ring with an open section.

The advantages achieved with the invention exist in that the machining tools' approach in the vertical plane with respect to the transported workpiece is maintained substantially more flexibly with the device according to the invention for machining, because the machining tools are arranged on an open arc, which is formed as an open ring. Based on this design, it is now possible, with the so-called open arc, to obtain a quasi-annular machining station, which can be moved, due to the movability of the open arc, such that the tools available on the arc reach all areas around the rod-shaped profile. If the open arc is moved into a position, it is possible that further tools, which are essential for profile machining, can be inserted into the open area of the arc in this case. Thus, cross-cut saws, miter saws, or a multi-axis saw, for example, can be inserted, which shorten the profile. It is also possible to insert milling tools, drills, or other tools, which can machine particularly the front areas of the profile in this case, after the sawing. Thus, in addition to the so-called full-circumference machining, it is possible, according to the profile, for separation as well as machining of the fronts to be done on a local station. This then results in the advantage that the device, or the line for machining the rod-shaped profiles in this case, can be maintained substantially shorter so that the system is per se substantially more compact. The compact construction means that the costs with such a system can thereby be reduced.

With the solution according to the invention, it is possible that, in addition to the insertion of the open flat ring from the side, i.e. in the X direction to the workpiece, the advantages of ring-shaped machining on the workpiece will result, wherein all-sided access for the machining tools is thereby obtained in one plane. Because, as a result of the open section, space for other machining tools which obtain access to the workpiece in the plane of the flat ring is then available.

The extensive flexibility and the reduction in the machining time are substantially achieved in that the machining device consists of or comprises an open arc arranged in the vertical plane to the workpiece, which is mounted so as to rotate about the workpiece as an open ring, wherein the open section of the ring is dimensioned such that tools opposite each other in the vertical plane of the machining device can be inserted into the area of the open section of the ring in order to machine the workpiece. Thus, practically all machining processes can now be carried out in one plane, in a vertical plane to the workpiece.

According to an especially advantageous design of the invention, the open ring is arranged as a flat ring on a gantry column, which can be moved in the X direction as relates to a machine frame. In doing so, the open ring can be moved vertically on the gantry column in the Y direction. In a further embodiment, a bracket is arranged on the gantry column for the open flat ring, on said bracket the back side of the open ring is mounted so as to rotate. Thus, the open ring is retained on the gantry column such that it can be moved upward in the Y direction as well as in the X plane to provide, in this manner, the flexibility of the open ring as relates to the workpiece to be machined. It is now possible that, by the open ring, it can practically be rotated about the workpiece to be machined such that the tools available on the ring accordingly obtain their accessibility to the workpiece.

According to an especially advantageous embodiment, the open flat ring is provided on the guide, for the pivotal positioning, on the bracket, which, on one hand, is retained in a movable manner on the gantry column by guides and, on the other hand, has a leg area protruding over the gantry column. The open flat ring is guided on the bracket here such that it can be rotated counter to the gantry column. In a further embodiment, the open ring for pivotal positioning in this case interacts with a drive arranged on the bracket, said drive being attached to the moveable bracket. According to a possible embodiment of a drive, the open ring in this case has a tensioned belt on its circumference, which interacts with a drive wheel of the drive, said drive wheel being arranged on a motor axle. However, other drives, such as toothed gearing, worm gearing, linear motor, or the like, are also conceivable for rotation about the ring. In order to ensure particularly a reliable and flexible pivotal positioning of the open ring on the bracket and in the guide in this case, deflection rollers, which guide the belt on the circumference of the ring and press against the circumferential surface of the ring, are provided both before and after the drive wheel.

According to an especially advantageous further embodiment of the invention, at least one movable carriage, on which a motor and machining tools are arranged, is arranged on the open ring, on the front side. Means for form-fitting with the motor are provided on the circumference of the open ring in this case. Thus, it is assured and provided that the machining tools can be moved over the circumference and/or the arc area of the ring, on the front area of the open flat ring. In a further embodiment, it is likewise provided that at least one tool, which is aligned radially to the workpiece, is durably mounted on the open ring, on one of the free ends of the ring. Based on the pivotal positioning of the open ring, the tools are in a position to be moved to any point on the workpiece, because particularly a 360° coverage is provided here.

As previously mentioned, a further machining tool is opposingly arranged on a gantry column movable in the X direction on a frame, in the plane of the open flat ring. The machining tool is also movable in the Y direction on the second gantry column. Thus, the machining tool can be moved into the area which is made accessible by the open ring when it is rotated accordingly such that the open section is directed toward the second opposing gantry column. The machining tool as such comprises in this case a saw, a milling tool, or a drill, with which an elongating of the workpiece or a machining of the front ends can take place accordingly.

BRIEF DESCRIPTION OF THE DRAWINGS

An exemplary embodiment of the invention is shown purely schematically in the drawings and described in more detail in the following.

The following is shown.

DETAILED DESCRIPTION

Figure 1:
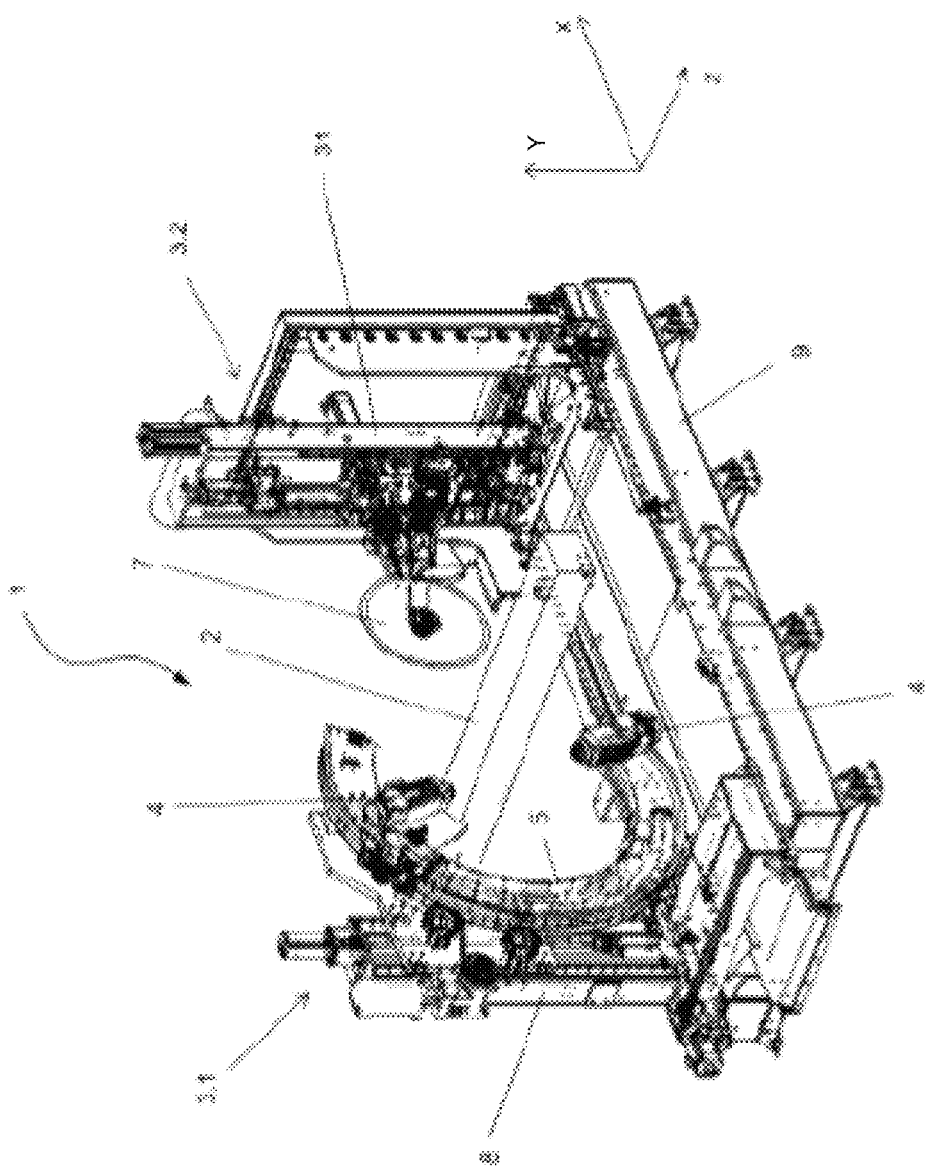
FIG. 1 shows a perspective representation of the device according to the invention for machining rod-shaped workpieces.
Figure 2:
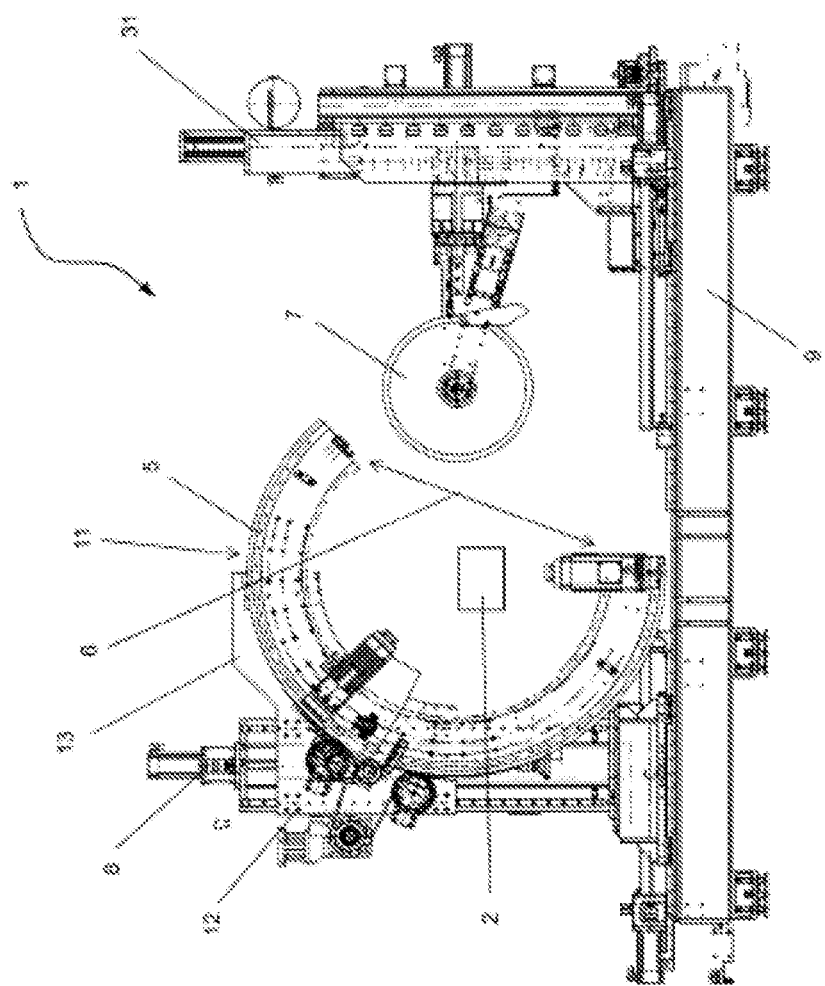
FIG. 2 shows a front view of the device according to FIG. 1.
Figure 3:
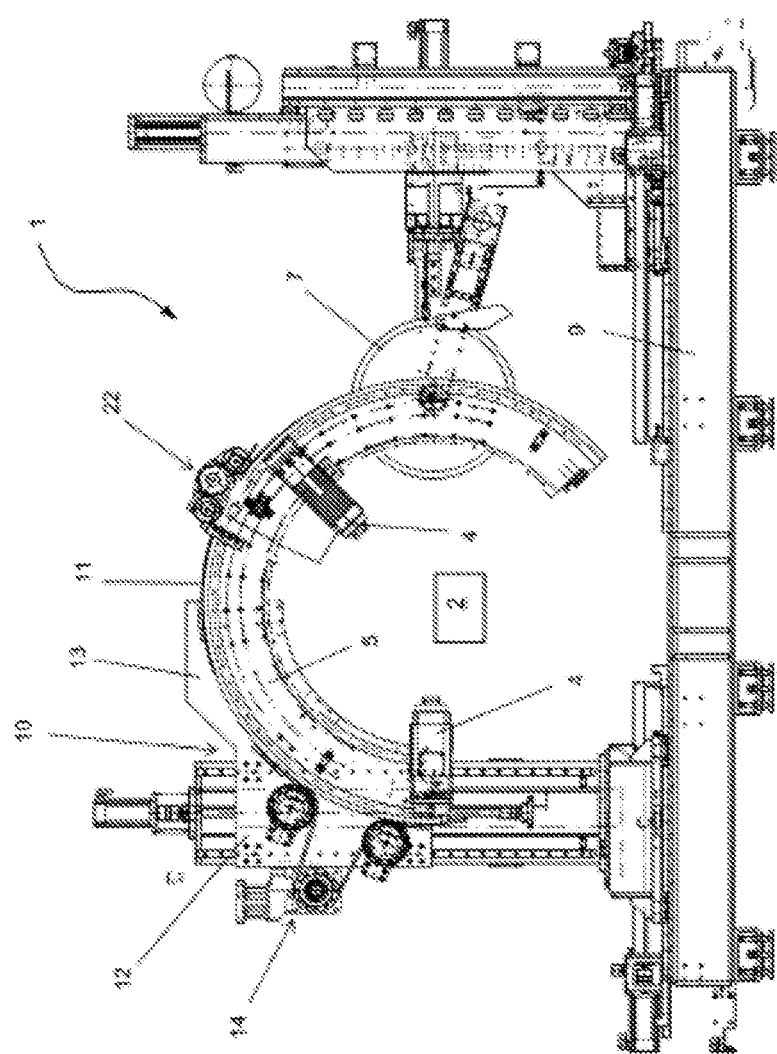
FIG. 3 shows a further front view in a wider position of the tools on the device according to FIG. 1.
Figure 4:
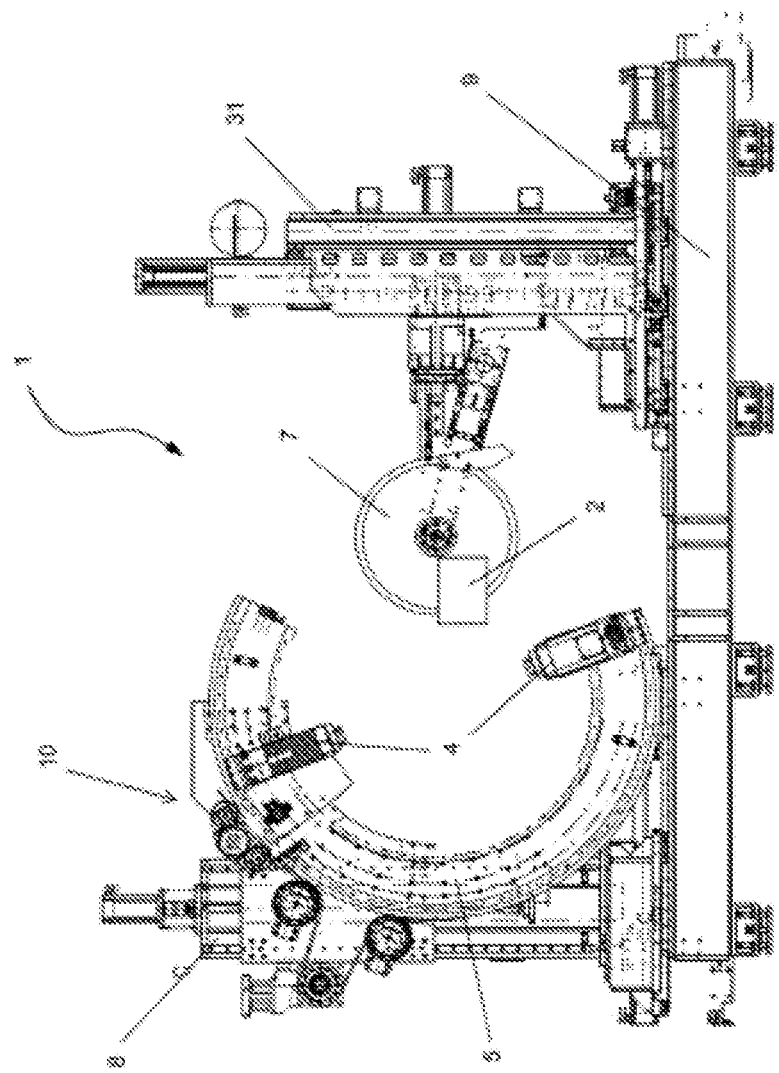
FIG. 4 shows a further front view in a wider position of the tools of the device in another view according to FIG. 1.

FIGS. 1, 2, and 3 as well as FIG. 4 show, each in individual views, the device 1 according to the invention for machining rod-shaped workpieces 2 such as, for example, window profiles or door profiles, which are movable in a horizontal plane in the Z direction by a transport device, which is not shown in greater detail. In a substantially vertically arranged plane—the Y plane in this case—with respect to the direction of movement of the workpieces 2, a machining device, 3.1 and 3.2, is provided with tools 4, which is specially aligned in the vertical plane in relation to the workpiece 2. As particularly shown in FIGS. 1, 2, 3, and 4, the machining device 3.1 consists of or comprises an open arc arranged in the vertical plane with respect to the workpiece 2, said arc being rotatably mounted about the workpiece 2 in the Z axis as an open flat ring 5.

In this case, the open flat ring 5 is dimensioned with an open section 6 such that tools 7 of machining device 3.2, which are counter to the vertical plane of machining device 3.1, can be inserted into the area of the open section 6 of the flat ring 5 for machining the workpiece 2, as is especially shown in FIG. 2 but also in greater detail in FIG. 4. As is especially shown in FIG. 1 but also clearly in FIG. 4, the open flat ring 5 is arranged on a gantry column 8, which can be moved in the X direction opposite a machine frame 9. The open flat ring 5 can be moved on the gantry column 8 vertically in the Y direction such that it can be moved upward once and to the workpiece 2 to be machined. From the overall view of FIGS. 1-4 but also in the detailed view of FIGS. 4 and 6, it can be seen that a bracket 10 for the open flat ring 5 is arranged on the gantry column 8. The open ring 5 in this case is rotatably mounted on the bracket 10 over its circumference 11. The bracket 10 itself is mounted so as to move in an area 12 on the gantry column 8 by a guide. In the area 12 of the bracket 10, a leg-like area 13 is added, on which a guide for the pivotal positioning of the open flat ring 5 is provided, as is particularly shown in FIG. 5. Thus, particularly the bracket 10 can be moved in the X and Y axes on the gantry column 8, wherein particularly the back side of the open flat ring 5 is mounted on the bracket 10 such that it can be correspondingly rotated on the bracket 10.

Figure 5:
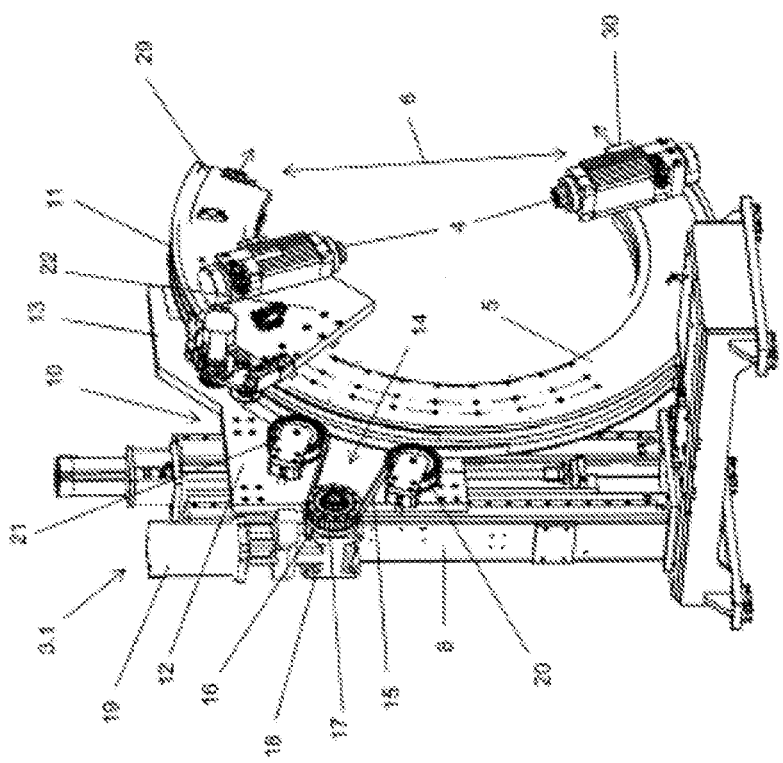
FIG. 5 shows a perspective representation of the open ring on the gantry column.
Figure 6:
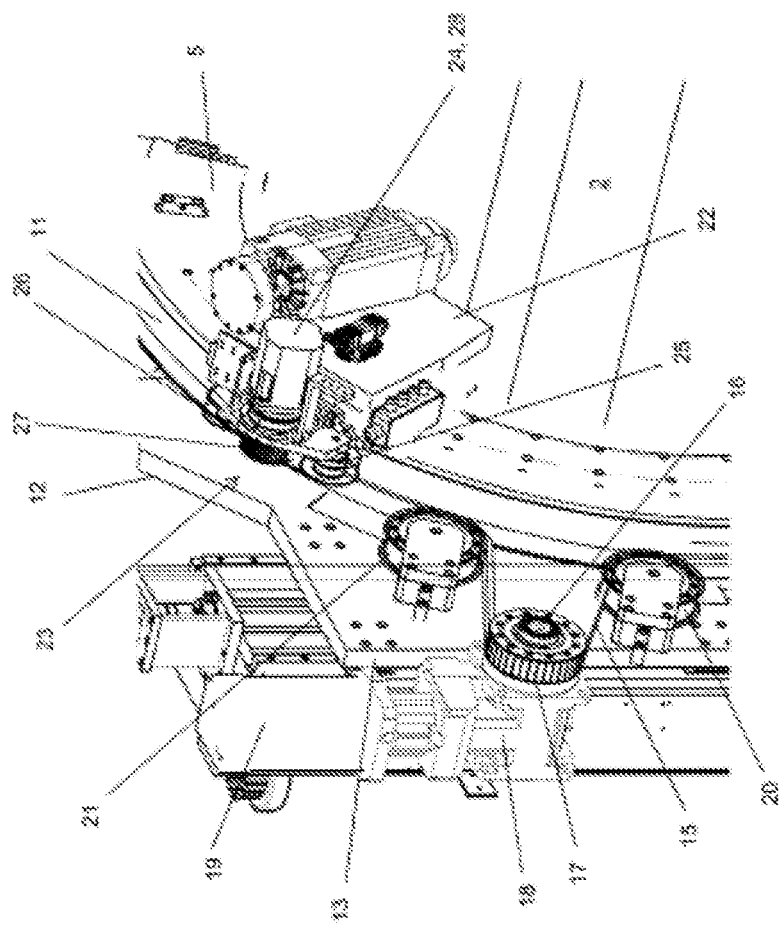
FIG. 6 is a perspective detailed view of a possible drive for the open ring as well as the carriage drive for the machining tool.

In this case, the open flat ring 5 for pivotal positioning interacts with a drive 14 arranged on the bracket 10, as can be seen in greater detail particularly in FIGS. 5 and 6. To this end, the open flat ring 5 has a tensioned belt 15 on its circumference 11, said belt interacting with a drive wheel 17 arranged on a motor axle 16, as is clearly shown in FIG. 6. The drive wheel 17 in this case is coupled to a motor 19 by gearing 18. It is further shown from FIG. 6 that deflection rollers 20 and 21 are arranged on the bracket, both before and after the drive wheels 17, said rollers guiding the belt 15 on the circumference 11 of the flat ring 5. It is thus clear that upon rotation of the drive wheel 17, the belt 15 is accordingly accommodated here by the circumference 11, wherein said belt then is again placed back on the circumference 1 accordingly after overrun of the drive wheel 17 by the deflection roller 20, 21 underneath and pressed against or onto the circumference 11. This drive 14 enables a rotating of the open flat ring 5 in the guide, on the bracket 10. The described drive here only documents a possible embodiment. Toothed gearing, linear motors, or the like are conceivable for use as drives for the pivotal positioning of the flat ring 5.

As is further shown particularly from FIGS. 5 and 6, at least one movable carriage 22 with a motor 24 on the front side is arranged on the open flat ring 5. The machining tools 4, which are aligned radially with respect to the workpiece 2, are arranged on the carriage 22. In this case, means 23 for a form-fit, such as a belt for example, with the motor 24 are provided on the circumference 11 of the open flat ring 5. It is obvious that motility of the carriage 22 in accordance with the described embodiment for rotating the open flat ring 5 accordingly on the carriage 22 may also be provided, wherein deflection rollers 25 and 26 as well as a drive wheel 27 and a motor 28 may also be provided accordingly such that the carriage 22 on the open flat ring 5 here can be moved over the circumference 11 in the front area. This then particularly results in a movable tool 4, which can be moved over the arc dimension of the open flat ring 5.

According to a special embodiment, at least one tool 4 durably mounted on the flat ring 5 is arranged on the open flat ring 5 on one of the free ends 29, 30 of the flat ring 5, said tool being aligned radially with respect to the workpiece 2; this can be seen accordingly in FIG. 5 but also in FIGS. 3, 4 as well as FIGS. 1 and 2. The fixed arrangement of the tool 4 makes it possible, due to the open circular shape, for the durably arranged tool 4, together with the movable tool 4, to reach any position on the workpiece 2 to be machined on the carriage.

In the overall view of FIGS. 1, 2, 3, and 4, it is clearly shown that a machining tool 7 is oppposingly arranged in the plane of the open flat ring 5, on the gantry column 31 movable in the X direction on the machine frame 9. The machining tool 7 on the gantry column 31 in this case is likewise movable in the Y direction such that it can be moved counter to the workpiece 2 to be machined such that it can engage from above as well as below. As particularly can be seen in the exemplary embodiments, the machining tool 7 in this case is a saw, with which particularly a separation of the rod-shaped workpiece 2 can be carried out, as is clearly shown, for example, in FIG. 4. Not shown, for example, are milling tools or a drill, which can then machine the front sides of the separated profiles from the opposite position accordingly.

LIST OF REFERENCE NUMERALS

1. Device
2. Workpiece
3. Machining device 3.1, 3.2
4. Tool on 3.1
5. Flat ring
6. Open section
7. Tool on 3.2
8. Gantry column, flat ring
9. Machine frame
10. Bracket
11. Circumference
12. Plate, guided area
13. Plate, leg area
14. Drive
15. Belt
16. Motor axle
17. Drive wheel
18. Gearing
19. Motor
20. Deflection roller
21. Deflection roller
22. Carriage
23. Means
24. Motor, carriage
25. Deflection roller
26. Deflection roller
27. Drive wheel
28. Motor
29. Free end
30. Free end
31. Gantry column

The invention claimed is:

1. A device for machining a rod-shaped workpiece, the workpiece being movable in a first direction relative to the device, the device comprising
    tools, the tools being arranged to a perform work on the workpiece
    an open arc arranged transverse to the first direction, the arc being an open flat ring with an open section, the open flat ring being rotatable about the workpiece, and
    at least one moveable carriage arranged on the open flat ring, on which at least one carriage a motor arranged to move the at least one carriage along the ring and a machining tool of the tools are arranged.

2. The device according to claim 1, wherein the open flat ring is arranged on a gantry column, the gantry column being movable in a second direction transverse to the first direction on a machine frame.

3. The device according to claim 2, wherein the open flat ring is movable in a third direction transverse to the first direction and to the second direction on the gantry column.

4. The device according to claim 1, wherein a bracket for the open flat ring is arranged on the gantry column, on which bracket the open flat ring is mounted for rotation.

5. The device according to claim 4, wherein a guide for rotation of the open flat ring is provided on the bracket.

6. The device according to claim 4, wherein the open flat ring is rotated by a drive arranged on the bracket.

7. The device according to claim 6, wherein the drive interacts with a periphery of the open flat ring.

8. The device according to claim 1, wherein at least one other tool of the tools is mounted on the open flat ring on a free end of the open flat ring.

9. The device according to claim 1, wherein a further tool of the tools is adapted to be extendable into the open section of the ring.

10. The device according to claim 9, wherein the further tool is arranged on a gantry column moveable in a second direction transverse to the first direction.

11. The device according to claim 10, wherein the further tool is movable in a third direction transverse to the first direction and to the second direction on the gantry column.

12. The device according to claim 9, wherein the further tool comprises a saw.

* * * * *